US009677502B2

(12) United States Patent
Caruel

(10) Patent No.: US 9,677,502 B2
(45) Date of Patent: Jun. 13, 2017

(54) NACELLE THRUST REVERSER AND NACELLE EQUIPPED WITH AT LEAST ONE REVERSER

(71) Applicant: AIRCELLE, Gonfreville l'Orcher (FR)

(72) Inventor: Pierre Caruel, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 368 days.

(21) Appl. No.: 14/720,403

(22) Filed: May 22, 2015

(65) Prior Publication Data

US 2015/0260126 A1 Sep. 17, 2015

Related U.S. Application Data

(63) Continuation of application No. PCT/FR2013/053014, filed on Dec. 10, 2013.

(30) Foreign Application Priority Data

Dec. 12, 2012 (FR) .................................... 12 61918

(51) Int. Cl.
*B64D 29/08* (2006.01)
*F02K 1/56* (2006.01)
(Continued)

(52) U.S. Cl.
CPC ................ *F02K 1/56* (2013.01); *B64D 29/08* (2013.01); *F02K 1/72* (2013.01); *F02K 1/763* (2013.01);
(Continued)

(58) Field of Classification Search
CPC ... F02K 1/56; F02K 1/625; F02K 1/72; F02K 1/763; F02K 1/766; F02K 1/80;
(Continued)

(56) References Cited

U.S. PATENT DOCUMENTS

2010/0107599 A1* 5/2010 Vauchel ................. B64D 29/08
60/226.2
2011/0272533 A1* 11/2011 Bourdon ................. B64D 29/08
244/53 B
(Continued)

FOREIGN PATENT DOCUMENTS

EP 0 845 581 A1 6/1998
FR 2 132 380 A1 11/1972
(Continued)

OTHER PUBLICATIONS

International Search Report issued Feb. 7, 2014 in International Application No. PCT/FR2013/053014.

*Primary Examiner* — Andrew Nguyen
(74) *Attorney, Agent, or Firm* — Burris Law, PLLC

(57) ABSTRACT

The present disclosure relates to a turbojet engine nacelle equipped with at least one thrust reverser. The thrust reverser includes: two half-cowls forming an outer cowl which is articulated on hinges and translates between closed and open positions, a first actuator to translationally actuate a downstream frame, a second actuator to rotationally actuate each half-cowl, and a lock capable of locking or unlocking the half-cowls relative to one another. In particular, the thrust reverser includes cascades vanes supported at their upstream end by an upstream frame and at their downstream end by the downstream frame, and a connector between the downstream frame and the external cowl. The cascade vanes are enclosed in a shroud formed by a fan casing and a fan cowl.

11 Claims, 2 Drawing Sheets

(51) Int. Cl.
*F02K 1/72* (2006.01)
*F02K 1/76* (2006.01)

(52) U.S. Cl.
CPC ...... *F05D 2230/72* (2013.01); *F05D 2260/36* (2013.01)

(58) Field of Classification Search
CPC F02K 1/82; B64D 29/08; B64D 29/06; F05D 2260/36; F05D 2230/72
See application file for complete search history.

(56) References Cited

U.S. PATENT DOCUMENTS

2012/0247571 A1* 10/2012 Vauchel ................ B64D 29/06 137/15.1
2013/0220435 A1* 8/2013 James .................... B64D 29/08 137/15.1

FOREIGN PATENT DOCUMENTS

| FR | 2 897 339 A1 | 8/2007 |
| WO | 2008 025890 | 3/2008 |

\* cited by examiner

NACELLE THRUST REVERSER AND NACELLE EQUIPPED WITH AT LEAST ONE REVERSER

CROSS-REFERENCE TO RELATED APPLICATIONS

This application is a continuation of International Application No. PCT/FR2013/053014, filed on Dec. 10, 2013, which claims the benefit of FR 12/61918, filed on Dec. 12, 2012. The disclosures of the above applications are incorporated herein by reference.

FIELD

The present disclosure relates a thrust reverser for a nacelle of a turbojet engine.

BACKGROUND

The statements in this section merely provide background information related to the present disclosure and may not constitute prior art.

In multi-engine aircrafts, each engine is housed in a nacelle serving at the same time as a support and as a cowl for the engine.

In general, this nacelle is connected directly or via a pylon, either to the wing or to the fuselage of the aircraft.

In addition to housing the turbojet engine, the nacelle may also receive different appended mechanical systems, and in particular a mechanical system for actuating the thrust reverser.

The thrust reverser is a device which allows directing forward the air flow generated by the turbojet engine, thereby allowing to shorten the landing distance and to limit application of the brakes of the landers.

In general, a nacelle has a substantially tubular structure, with an air inlet upstream of the turbojet engine, followed by a mid-section intended to surround a turbojet engine fan, a downstream section integrating the thrust reversal means and surrounding the combustion chamber of the turbojet engine at the same time.

The nacelle further comprises, at its downstream end, a nozzle for ejecting the flow leaving the turbojet engine.

Most modern technologies use bypass turbojet engines; in these turbojet engines, both a hot air flow called primary flow, and a cold air flow called secondary flow are generated via the blades of the fan.

This second flow called cold air flow circulates outside the turbojet engine through an annular passageway also called flow path, this flow path being formed between a fairing of the turbojet engine and the inner wall of the nacelle.

In this type of engine, the thrust reverser, partially or fully obstructs the cold air flow path, in order to redirect this flow toward the front of the nacelle.

There are several different technologies for realizing these thrust reversers.

One technology, which is particularly interesting because it reduces the length of the nacelle and consequently limits both its mass and its drag, consists of movable cascade-type thrust reversers wherein the cascades are housed between the casings and the cowl of the fan, during a direct jet operation of the nacelle.

In this type of thrust reverser, the reversal is achieved by translating the outer cowl with the cascades which thereby get out of their housing and allow directing forward the air flow.

Moreover, there are also two major types of nacelle structures, namely a first type wherein the outer cowl is formed with two substantially semi-cylindrical shaped half-cowls, these two half-cowls being hinged at the upper portion on hinges substantially parallel to the translational direction of the outer cowl.

The connection between the two half-cowls is achieved by locks disposed at the lower portion.

A second type of structure of the nacelle is called integral or O-structure and wherein the outer cowl is formed from a single cylindrical piece.

The present disclosure concerns the field of nacelles of the mentioned first category, commonly called D-structure nacelles, and provides an improvement to the D-structure nacelles and to the movable cascade-type thrust reverser nacelles.

As in all types of nacelles, maintenance operations are to be provided for regularly and in order to do this, it is necessary to be able to access the inside of the nacelle and, for example the turbojet engine, or still the appended devices and in particular the inner structure of the thrust reverser.

In the specific device type within which the present disclosure falls, access to the inside of the nacelle is achieved by performing the unlocking at the two half-cowls enabling a <<butterfly>>-like opening, after having performed beforehand an unlocking between the movable cascades and the half-cowls.

We understand this double unlocking is particularly disadvantageous on the one hand, disconnection of the movable cascades is complicated by a restricted access to the disconnection system and on the other hand, this double unlocking system increases the weight of the nacelle in a detrimental manner; finally, this double unlocking system also increases the dimensions of the nacelle and the associated cowl.

SUMMARY

The present disclosure provides a nacelle with a thrust reverser wherein access to the engine is authorized by one single manual unlocking action.

Another benefit of the present disclosure is to propose a nacelle wherein access to the engine may be achieved indifferently when the outer cowl is translated backwards, which corresponds to the indirect jet position or still forwards, which corresponds to the direct jet position.

The present disclosure also provides a nacelle wherein access to the engine can be achieved when the fan cowl is fixed or closed.

Another aspect of the present disclosure is to propose a nacelle of which the weight and the dimensions are improved relative to D-structure nacelles, having a movable cascade-type thrust reverser, which are conventionally used until now.

More specifically, the present disclosure provides a thrust reverser for a nacelle of a turbojet engine, comprising:
  at least one outer cowl, made of two half-cowls hinged on hinges, movable in translation from a position called closed position toward at least one position called open position;
  first means for translationally actuating the downstream frame;
  second means for rotatably actuating each half-cowl;
  means for locking/unlocking the half-cowls together;
  thrust reversal means comprising at least cascade vanes supported at their upstream end by an upstream frame, and at their downstream end by a downstream frame, and enclosed in an envelope formed by a fan casing and by a fan cowl; and connecting means between the downstream frame and the outer cowl, and such that, according to the present disclosure, the connecting means of the thrust reverser allow keeping the outer cowl and the downstream frame secured to one another when actuating the first translational actuating means, and detaching the outer cowl from said downstream frame when actuating the second rotational actuating means after having unlocked said half-cowls, so as to provide access to the inside of the nacelle in one single manual unlocking operation.

The present disclosure also concerns a nacelle or a turbojet engine of an aircraft, comprising at least one thrust reverser according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
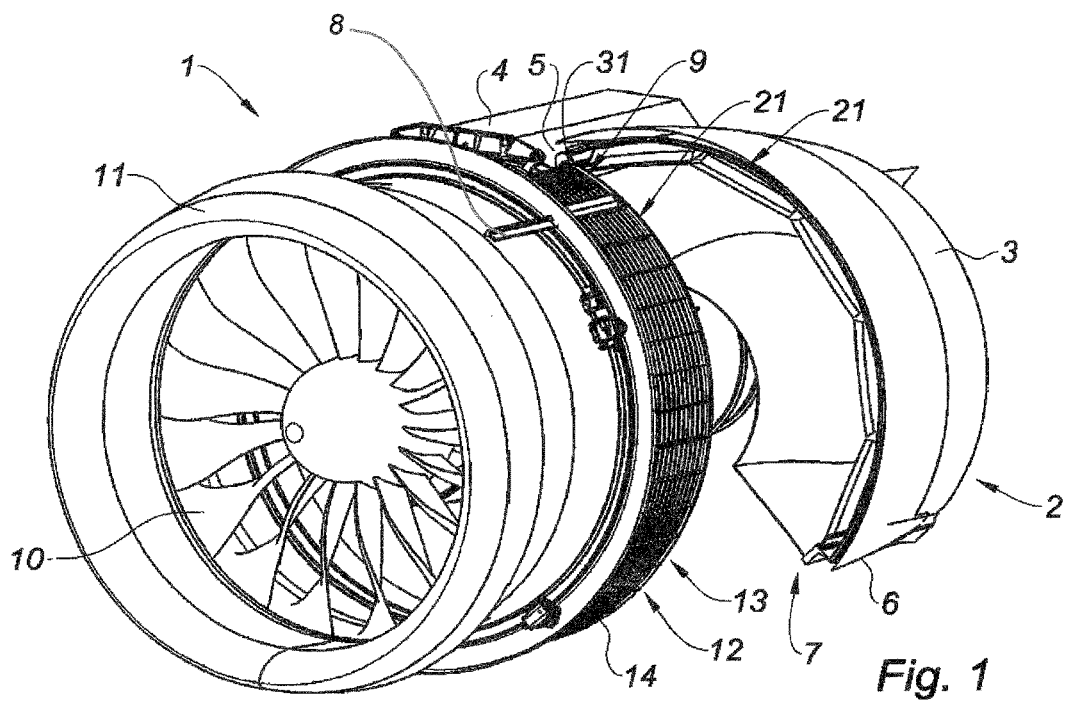
FIG. 1 represents a schematic perspective view of a nacelle of a turbojet engine realized in accordance with the present disclosure in a maintenance position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1 which represents a nacelle 1 of a turbojet engine (not represented), disposed in the maintenance configuration with an outer cowl 2 realized with two half-cowls 3, connected to the upper portion of the nacelle 4, this upper portion 4 being intended to serve as a connecting interface with an engine pylon, not represented in the appended drawings.

In this figure, it can be seen that it is actually a nacelle 1 of the D-structure type, thereby with two half-cowls 3 hinged at their upper portion by means of hinges 5 and including at their lower end 6 means for locking/unlocking the half-cowls 3 together.

The downstream frame may perform a backward translational movement by means of the first actuating means 8 which are connected thereto.

The outer cowl 2 may perform a backward translational movement, and also when the outer cowl 2 is unlocked, second actuating means 9 enable a rotational displacement of each half-cowl 3.

The fan 10 and the fan cowl 11 can also be seen in this FIG. 1.

Figure 2:
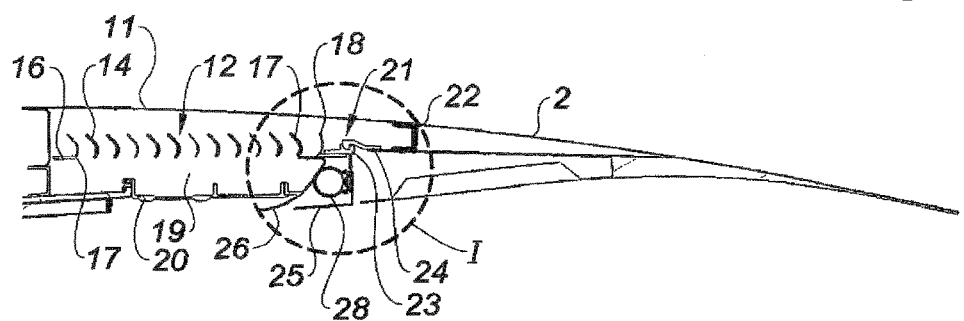
FIG. 2 is a sectional view of the nacelle represented in FIG. 1 and centered on the mid portion of the nacelle at the movable cascades.
Figure 3:
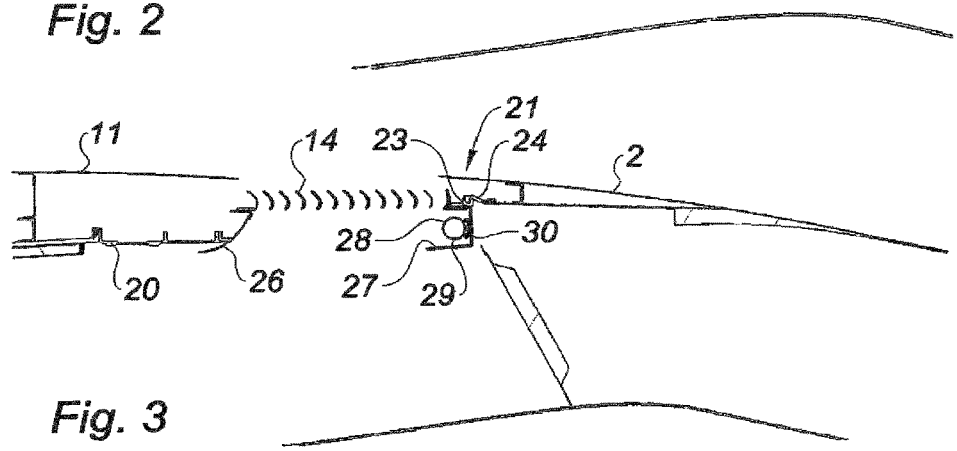
FIG. 3 is a sectional view of the nacelle as represented in FIG. 2, the nacelle being disposed in reverse jet mode.

Referring now more particularly to FIGS. 2 and 3, where different portions of the nacelle 1, and in particular a thrust reverser 12, can be seen in more detail, said nacelle 1 being in the direct jet position in FIG. 2, and in the reverse jet position in FIG. 3.

As is represented in FIG. 2, the thrust reverser 12 comprises reversal means 13, with cascade vanes 14.

These cascade vanes 14 are supported at their upstream end 15 by an upstream frame 16 and at their downstream end 17 by a downstream frame 18.

In a variant of the present disclosure, the upstream frame 16 allows providing simply the connection of the cascade vanes 14 together.

In the direct jet configuration, it can be seen that these cascade vanes 14 are enclosed in an envelope 19 formed by the fan casing 20, and by the fan cowl 11.

The thrust reversal means 13 further include connecting means 21 between the downstream frame 18 and the outer cowl 2.

It can be seen when referring this time mainly to FIG. 3, that the connecting means 21 allow keeping the outer cowl 2 and the downstream frame 18 secured together, when actuating the first actuating means 8.

Thus, it can be seen in FIG. 3 that the first actuating means 8 have driven backwards the downstream frame 18 and the cascade vanes 14 which are secured thereto, and that this backward translation of this downstream frame 18 has caused the displacement along this same direction of the outer cowl 2.

Figure 4:
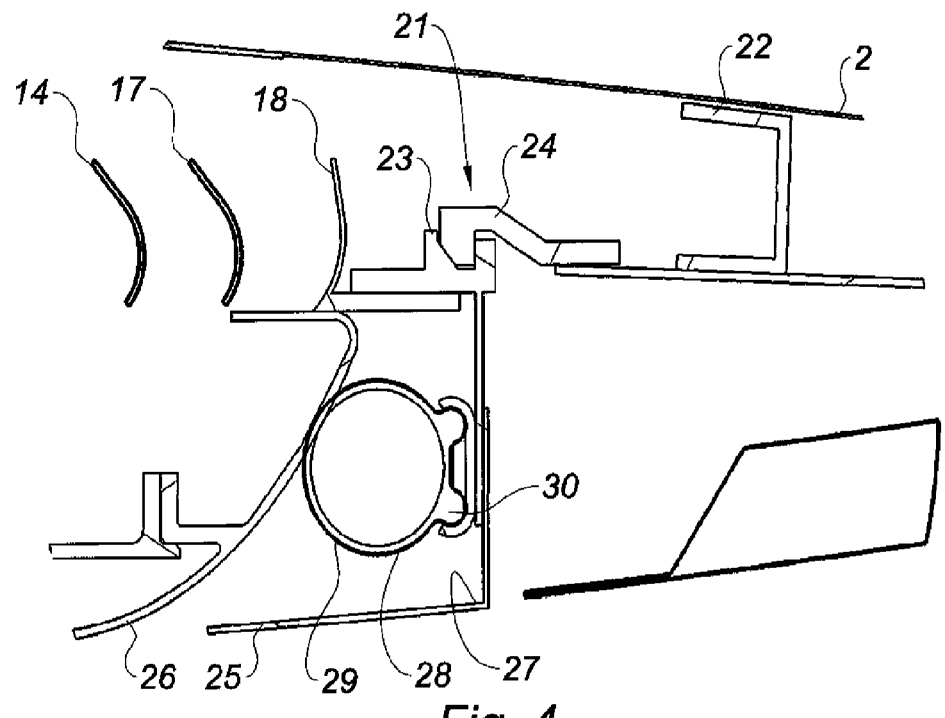
FIG. 4 represents an enlarged view of the form detail denoted with I in FIG. 2.

Referring now more particularly to FIG. 4, the portion denoted in uppercase characters in FIG. 2 is represented in more detail.

This detail allows visualizing more precisely the connecting means 21 between the downstream frame 18, secured to the cascade vanes 14, and the outer cowl 2 via the inter-panel frame 22.

According to one form, illustrated in FIGS. 1 to 4, the connecting means 21 comprise a spline 23 cooperating with a knife 24.

The spline 23 is secured to the downstream frame 18, whereas the knife 24 is secured to the outer cowl 2 via the inter-panel frame 22.

At this stage, in another form, the spline 23 may be secured to the outer cowl 2, whereas the knife 24 may be secured to the downstream frame 18.

It is also possible to create a knife 24 the geometry of which allows fixing it directly on the outer cowl 2.

Finally, according to another form, it is possible to realize the downstream frame 18 and the spline 23 from the same single piece.

As is represented in FIG. 4, it can be seen that the end 24 of the knife is engaged in the spline 23, so that, when the first actuating means 8 are activated, the cascade vanes 14 and the downstream frame 18 switch from the position illustrated in FIG. 2 to that of FIG. 3, that is to say move translationally backwards thereby driving in turn the spline 23 which, while cooperating with the knife 24, also drives and thereby moves backwards the outer cowl 2.

When the first actuating means 8 are activated to return to the direct jet position, that is to say to switch from the position illustrated in FIG. 3 to that of FIG. 2, driving is performed in the same manner, that is to say, the cascade vanes 14 and the downstream frame 18 are driven forwards toward the fan cowl 11 inside their envelope 19, thereby displacing the spline 23 which cooperates with the knife 24 and repositions the outer cowl 2 in its initial position.

Referring again to FIG. 1, it can be seen that the two half-cowls 3 are partly raised thereby enabling access to the turbojet engine and moreover, it can be seen that the cascade vanes 14, as well as the downstream frame 18, are no longer connected to the outer cowl 2.

To do so, the operator actuates the second actuating means 9, after having unlocked the half-cowls 3 beforehand, using the locking/unlocking means 7.

The unlocking of half-cowls 3 allow them to pivot about the axis formed by their respective hinges 5.

The second actuating means 9 allow rotating each half-cowl 3, namely raising them for access operations inside the nacelle 1 or still when maintenance operations are carried out, and lowering them in order to lock the half-cowls 3 together.

It should be noted that, to this end, the second rotational actuating means 9 include opening control cylinders 31, these control cylinders 31 being attached, on the one hand, on one side either to the cascade vanes 14 or in another variant to the downstream frame 18, and on the other hand, on the other side to an element secured to the outer cowl 2.

When the nacelle will be intended to house small-sized engines, rotation of the half-cowls 3 may be carried out manually. To this end, a locking rod will be extended and locked manually in order to provide maintaining of the assembly in the open position.

Figure 5:
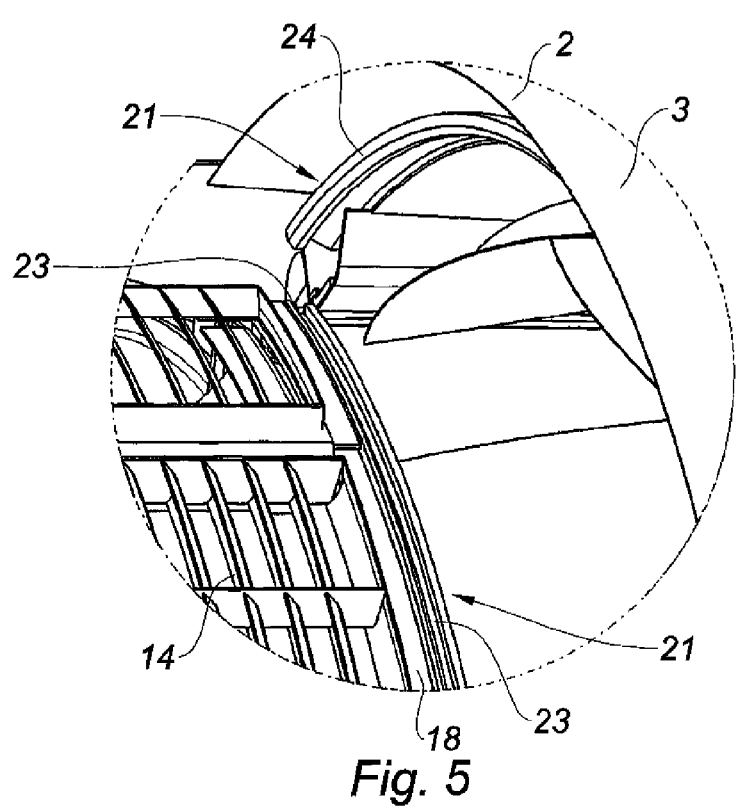
FIG. 5 represents, in a perspective view, the connecting means in the disconnected position.

Referring now to FIG. 5, which represents the connecting means 21 in the disconnected position, we understand that when the outer cowl 2 or more exactly when the half-cowls 3 are rotated, the knife 24, secured to the outer cowl, is also rotated and the head of the knife 24 gets out of the spline 23.

Thus, disconnection between the outer cowl 2 and the downstream frame 18 is automatically achieved when actuating the second actuating means 9, thanks to the particular structure of the connecting means 21.

Therefore, it is no longer necessary to carry out two manual unlocking operations, namely one at the cascade vanes 14 and the second one at the half-cowls 3.

Hence, this structure of the connecting means 21 is particularly advantageous in comparison with the existing solutions in the field of nacelles of the D-structure type with movable cascades, since it provides both a reliable translational driving between the cascade vanes 14 and the outer cowl 2, while providing disconnection between these elements, when the second actuating means 9 raise the half-cowls 3.

Another advantage of this structure is that disengaging the knife 24 with respect to the spline 23 may be achieved regardless of the position of the outer cowl 2 with respect to the fan casing 20, that is to say when the nacelle 1 is in the direct jet position or in the reverse jet position or still for any intermediate position between these two extreme positions.

Referring again to FIG. 4, it can be seen that the spline 23 is connected to a junction piece 25. This junction piece 25 is intended to provide aerodynamic continuity with the deflection edge 26 of the fan casing 20.

Advantageously, it can be seen that this junction piece 25 which may have a substantially V-shaped profile, also carries, on its inner face 27, a sealing gasket 28. This sealing gasket 28 is in contact with the deflection edge 26 of the fan casing, thereby inhibiting the creation of a secondary flow between the fan casing and the front of the flaps, when the nacelle 1 is in the direct jet position. Advantageously, the sealing gasket 28 includes a base 29 attached to the junction piece 25, as well as a hollow tubular portion 30 in contact with the deflection edge 26, the hollow tubular portion 30 allowing a crushing of the gasket on the wall of the deflection edge 26, thereby improving the same sealing of this area.

According to another form, cooperation with the engine pylon of the nacelle is also provided at an end of the cascade vanes 14. The end of the cascade vanes 14 allows sliding of the cascade along the latter allowing collaboration with an engine suspension positioned at the cascade vanes 14. Advantageously, this cooperation is achieved by means of U-shaped rail which allows taking up the vertical loads applied at said end of the cascades.

Thanks to the present disclosure, there is disposed a nacelle 1 equipped with a thrust reverser 12, wherein it is not necessary to dispose safety and locking elements between the cascade vanes 14 and other fixed assemblies of the nacelle 1, thereby allowing for an easier access to the engine, reduced volume and weight for the nacelle 1, while providing a reliable switching from the direct jet mode to the reverse jet mode and vice versa.

Of course, the present disclosure is not limited to the described form of this thrust reverser and of this nacelle, other characteristics and advantages of the present disclosure will become clear to those skilled in the art, while remaining within the scope defined by the following claims.

What is claimed is:

1. A thrust reverser for a nacelle of a turbojet engine, comprising:
   at least one outer cowl movable in translation from a closed position toward an open position, said at least one outer cowl made of two half-cowls hinged on hinges;
   a first actuator for translationally actuating a downstream frame;
   a second actuator for rotatably actuating each of the two half-cowls;
   a lock for locking and unlocking the two half-cowls together;
   cascade vanes supported at an upstream end thereof by an upstream frame and at a downstream end thereof by the downstream frame, the cascade vanes being enclosed in an envelope formed by a fan casing and a fan cowl; and
   a connection between the downstream frame and said at least one outer cowl,
   wherein the connection keeps said at least one outer cowl and the downstream frame secured together when actuating the first actuator and wherein, after unlocking the two half-cowls, the connection detaches said at least one outer cowl from the downstream frame when actuating the second actuator so as to provide access to an inside of the nacelle in one single manual unlocking operation.

2. The thrust reverser according to claim 1, wherein the connection comprises a spline secured to the downstream frame or to said at least one outer cowl and a knife respectively secured to the other of said at least one outer cowl or to the downstream frame, the spline and the knife cooperating so as to provide driving thereof during a translational movement and also detachment during a rotational movement of the knife relative to the spline.

3. The thrust reverser according to claim 2, wherein the spline is secured to the downstream frame and the knife is secured to said at least one outer cowl.

4. The thrust reverser according to claim 3, wherein the downstream frame and the spline form a single piece.

5. The thrust reverser according to claim 3, wherein the spline is secured to a junction piece, providing an aerodynamic continuity with a deflection edge of the fan casing.

6. The thrust reverser according to claim 5, wherein the junction piece carries a sealing gasket on an inner face thereof, the sealing gasket being in contact with the deflection edge of the fan casing.

7. The thrust reverser according to claim 6, wherein the sealing gasket includes a hollow tubular portion, enabling crushing of the sealing gasket on a wall of the deflection edge.

8. The thrust reverser according to claim 3, wherein the knife is fixed on an inter-panel frame secured to said at least one outer cowl.

9. The thrust reverser according to claim 1, wherein the second actuator includes opening control cylinders attached to the cascade vanes or to the downstream frame, and to said at least one outer cowl.

10. The thrust reverser according to claim 1, wherein an end of the cascade vanes cooperates with an engine pylon allowing a sliding of the cascade vanes along the engine pylon thereby enabling collaboration with an engine suspension positioned at the cascade vanes.

11. A nacelle for a turbojet engine comprising at least one thrust reverser according to claim 1.

* * * * *